United States Patent [19]

Brotsky

[11] Patent Number: 4,543,260
[45] Date of Patent: Sep. 24, 1985

[54] PROCESS FOR CURING BACON, PRODUCT THEREOF AND COMPOSITION THEREFOR

[75] Inventor: Eugene Brotsky, Pittsburgh, Pa.
[73] Assignee: Stauffer Chemical Company, Westport, Conn.
[21] Appl. No.: 574,197
[22] Filed: Jan. 26, 1984

Related U.S. Application Data

[63] Continuation of Ser. No. 433,302, Oct. 7, 1982, abandoned, which is a continuation-in-part of Ser. No. 340,548, Jan. 18, 1982, abandoned, which is a continuation of Ser. No. 220,582, Dec. 29, 1980, abandoned, which is a continuation of Ser. No. 88,713, Oct. 26, 1979, abandoned.

[51] Int. Cl.$^4$ ............................ A23B 4/02; A23L 1/31
[52] U.S. Cl. .................................. 426/266; 426/332; 426/641; 426/652
[58] Field of Search ............... 426/264, 265, 266, 332, 426/641, 645, 647, 652, 806; 252/397, 399, 400 R, 400 A

[56] References Cited

U.S. PATENT DOCUMENTS

| Re. 30,023 | 6/1979 | Hawley et al. |
|---|---|---|
| 2,145,417 | 1/1939 | Hall . |
| 2,513,094 | 6/1950 | Hall . |
| 2,575,176 | 11/1951 | Lefforge . |
| 2,575,177 | 11/1951 | Lefforge . |
| 2,575,178 | 11/1951 | Lefforge . |
| 2,575,179 | 11/1951 | Lefforge . |
| 2,596,067 | 5/1952 | Brissey . |
| 2,735,776 | 2/1956 | Bickel . |
| 2,812,261 | 11/1957 | Wasserman . |
| 2,823,132 | 2/1958 | Sair . |
| 2,824,809 | 2/1958 | Schoch . |
| 2,828,212 | 3/1958 | Sair . |
| 2,852,392 | 9/1958 | Huber et al. . |
| 2,868,654 | 1/1959 | Haynes . |
| 2,875,068 | 2/1959 | Klein . |
| 2,903,366 | 9/1959 | Clarkson . |
| 2,937,094 | 5/1960 | Rupp et al. . |
| 3,028,246 | 4/1962 | Oliver et al. ................ 426/264 |
| 3,032,421 | 5/1962 | Buchholz . |
| 3,037,870 | 6/1962 | Schleich et al. . |
| 3,104,170 | 9/1963 | Mahon ........................ 426/332 |
| 3,118,777 | 1/1964 | Lauck et al. . |
| 3,122,442 | 2/1964 | Sair . |
| 3,139,347 | 6/1964 | Sair et al. ................. 426/264 X |
| 3,154,421 | 10/1964 | Voegeli et al. ................ 426/265 |
| 3,193,396 | 7/1965 | Sair . |
| 3,201,263 | 8/1965 | Humphreys et al. . |
| 3,215,540 | 11/1965 | Wierbicki et al. .............. 426/264 |
| 3,231,392 | 1/1966 | Sair . |
| 3,240,612 | 3/1966 | Wolnak . |
| 3,255,022 | 6/1966 | Hinkley et al. . |
| 3,255,023 | 6/1966 | Humphreys et al. . |
| 3,391,007 | 7/1968 | Sair et al. ..................... 426/266 |
| 3,493,392 | 2/1970 | Swartz . |
| 3,595,679 | 7/1971 | Schoch et al. ................ 426/264 |
| 3,653,847 | 4/1972 | Abelson . |
| 3,666,488 | 5/1972 | Nakao et al. . |
| 3,681,091 | 8/1972 | Kohl et al. . |
| 3,782,975 | 1/1974 | Zyss ............................ 426/281 |
| 3,845,227 | 10/1974 | Shults et al. . |
| 3,855,397 | 12/1974 | Hoffman et al. . |
| 3,875,313 | 4/1975 | Brotsky . |
| 3,966,974 | 6/1976 | Bharucha et al. . |
| 4,079,153 | 3/1978 | Coleman . |
| 4,113,885 | 9/1973 | Zyss ............................ 426/264 |
| 4,115,307 | 9/1978 | McGilvery .................... 252/135 |
| 4,119,735 | 10/1978 | Maher et al. .................. 426/264 |

FOREIGN PATENT DOCUMENTS

| 1091843 | 10/1960 | Fed. Rep. of Germany . |
|---|---|---|
| 1252281 | 12/1960 | France . |
| 968331 | 9/1964 | United Kingdom . |
| 1040600 | 9/1966 | United Kingdom . |
| 1218081 | 1/1971 | United Kingdom . |
| 2084850 | 4/1982 | United Kingdom . |

OTHER PUBLICATIONS

"Encyclopedia of Labeling Meat and Poultry Products", J. C. deHoll, Editor, p. 131.
"The Food Chemical News Guide", Jun. 19, 1978 from Food Chemical News, Inc., p. 410.1.
Belgium 617,735 (C.A. 58, 12206g–1963).

Primary Examiner—Arthur L. Corbin
Attorney, Agent, or Firm—Paul J. Juettner

[57] ABSTRACT

Residual nitrite levels in bacon can be lowered using a curing system of salt, nitric oxide-forming compound, such as sodium nitrite, erythorbate and a blend of sodium hexametaphosphate with a carbonate alkalizing agent, preferably sodium bicarbonate.

13 Claims, 1 Drawing Figure

PROCESS FOR CURING BACON, PRODUCT THEREOF AND COMPOSITION THEREFOR

CROSS REFERENCE TO RELATED APPLICATIONS

This is a continuation of application Ser. No. 433,302 filed Oct. 7, 1982, now abandoned, which application is a continuation-in-part of application Ser. No. 340,548 filed Jan. 18, 1982, now abandoned, which in turn is a continuation of application Ser. No. 220,582 filed Dec. 29, 1980, now abandoned, which is a continuation of application Ser. No. 88,713 filed Oct. 26, 1979, now abandoned.

FIELD OF THE INVENTION

The present invention relates to an improved process for preparing phosphate-containing nitrite cured bacon having a lower residual nitrite level.

DESCRIPTION OF THE PRIOR ART

Bacon is normally cured by pumping the same with a pickle solution. The pickle solution usually contains salt (NaCl), a nitric oxide source such as sodium nitrite or sodium nitrate, an alkaline polyphosphate salt such as sodium tripolyphosphate, sodium pyrophosphate or disodium phosphate and salts of ascorbic acid or isoascorbic (erythorbic) acid. Other materials such as spices and sugar can be present in the curing mixture. Salts of ascorbic acid or isoascorbic acid have been found to be useful in the pickle to accelerate the formation of cured meat pigments and are required in bacon to inhibit nitrosamine formation.

The addition of the phosphate salt to the pickle solution substantially improves the yield and texture of the cured meat product after cooking. The phosphate has the ability to bind the water or solution to the protein in the meat so that it does not readily escape during cooking. The resultant cooked product is more juicy, has a higher yield and is tender and has superior appearance because of reduced shrinkage during cooking.

The nitrite salt has proven to be unique inasfar as cured meat preservation, flavor and color development is concerned. It is known that the nitrite has a preservative action which is specifically active against particular food spoiling organisms of the species Clostridium and Salmonella and, particularly, *C. botulinum*. The nitrite also has the distinctive function of reacting with the pigments myoglobin and hemoglobin present in the pork, converting them to their nitrosyl derivatives giving bacon its characteristic color.

In theory, the active ingredient is not the nitrite per se but nitric oxide which is obtained on the breakdown of the nitrite. The nitric oxide is apparently responsible both for the color and preservation effects attributed to the nitrite. The breakdown reaction from nitrite to nitric oxide is favored by acidic pH.

The benefits of the nitrite have been offset by the recent discovery that minute amounts of undesirable nitrosamines may occur in bacon which has been cooked by methods in which the fats reach relatively high temperatures. The cooked or fried product can contain the material N-nitrosopyrrolidine, a compound known to be a carcinogen, as well as the carcinogenic compound dimethylnitrosamine. Numerous studies have been undertaken regarding methods for overcoming this problem. U.S. Pat. No. 4,079,153 suggests suppressing the nitrosamine formation by the use of 1,2-dihydroquinoline. U.S. Pat. No. 3,966,974 suggests the use of organic nitrites which have lower temperatures of volatility.

The preservation effect of the nitrite or nitric oxide is that of a non-growth compound. Botulinum spores are destroyed upon germinating as long as the compound is in their midst thereby preventing formation of the botulism toxin. As soon as the nitrite is removed, any remaining spores can continue their germination process. The U.S. government presently assumes that a pound of bacon will be fried in the home after three weeks of the time of its curing. In order to cure a bacon product, it is necessary to achieve a high level of nitrite during curing. It is desirable to then reduce the nitrite level to a sufficiently low level during the holding period such that the frying of the bacon under such low levels of nitrite would not be a substantial health hazard.

According to the U.S.D.A. regulations, a pickle for pumping bacon must be able to provide on an ingoing basis 120 ppm residual sodium nitrite at the percentage pumped into the bacon after an appropriate drainage time of up to 30 minutes. An industry accepted deviation is ±20 ppm sodium nitrite. A pickle which is outside those ranges cannot be used.

The preferred pickle solutions of the prior art contain alkaline phosphates. The alkalinity is desirable to prevent the breakdown of the nitrite into nitric oxide while the pickle solution is in the tank. The use of alkaline polyphosphate acts to stabilize the nitrite in the pickle and maintain high residuals in the bacon.

The admixture of a nitrite solution with an acidic compound causes the formation of nitric oxide which would evolve from the tank. This has occurred in using sodium acid pyrophosphate or a large amount of sodium hexametaphosphate in a pickle.

While the use of acid would allow the nitrite to break down in the bacon and thereby provide low nitrite residuals, acidic conditions make the nitrite too unstable for maintaining nitrite levels within legal limits in the pickle.

The alkalinity of sodium tripolyphosphate is such that the natural pH of the meat of 5.8 would be elevated and the meat would not be sufficiently acid to promote the rapid degradation of the nitrite to nitric oxide. Large nitrite residuals would, therefore, remain in the meat at the time of cooking.

Attempts have been made to replace the phosphate by the use of blends of alkali hydroxide or an alkali bicarbonate in combination with small quantities of alkali citrate or citric acid (see U.S. Pat. No. 3,215,540). In one such system, the pH of the brine is elevated to 11.5–12 with sodium hydroxide and added to the meat in such an amount sufficient to raise the meat pH to a pH of about 6.5–6.7. The patent quite clearly states that the residual nitrite levels were improved significantly over a sodium tripolyphosphate control. In a ham, levels of 300% greater residuals were noted (see Table V of the patent).

It has also been found that an erythorbate (isoascorbate) originally added for color development has an additional effect of inhibiting nitrosamine formation. However, at the levels required for inhibition, the nitrite stability of an acid pickle is further reduced. While a standard pickle of salt, sodium tripolyphosphate, nitrite and erythorbate has a pH of about 7 (very stable—contributes to high residuals), a pickle containing salt, sodium hexametaphosphate, nitrite and erythorbate has a pH of about 5 and is unstable as far as nitrite is concerned so that a legal pickle cannot be maintained for any practical period of time.

It has now been found that the requirement for nitrite stabilization in a pickle solution and nitrite breakdown during and after curing of bacon in connection with phosphate and erythorbate containing nitrite pickle solutions can be attained for practical plant use.

THE INVENTION

In accordance with the present invention, cured bacon can be treated in such a way as to retain the usual benefits of phosphates of improved color, yield and flavor while also providing low residual nitrite levels after three weeks by the use of a stable pickle containing an alkali metal hexametaphosphate, e.g. sodium hexametaphosphate, salt (NaCl), a nitric oxide source such as an alkali metal nitrite, an erythorbate nitrosamine inhibitor and a carbonate alkalizing agent such that the pH of a pickle containing salt, a hexametaphosphate, a carbonate akalizing agent, nitrite and an erythorbate at makeup ranges from about 5.0 to about 5.6 though makeup ranges from about 5.5 to about 6.0 can be used and after use for at least 4 hours ranges from about pH 5.5 to about pH 7 in deference to a pickle containing salt, sodium tripolyphosphate, nitrite and an erythorbate which has a pH of about 7 and a pickle containing sodium hexametaphosphate, nitrite, salt and an erythorbate which has a pH of about 5. The carbonate alkalizing agent acts to stabilize nitrite degradation in the pickle caused by an acidic reacting phosphate, such as sodium hexametaphosphate, or an erythorbate thereby forming a stable pickle and yet allowing for sufficient breakdown in the bacon for low residual nitrite levels.

The pH of alkaline phosphate-treated meat is generally from 0.3 pH units above the natural pH of the meat, whereas the pH of the meat treated with the disclosed invention is about equivalent to that of the natural meat, within 0.2 pH units of the meat pH. The preferred pickle solutions contain from about 93% to about 97% sodium hexametaphosphate and from about 3% to about 7% carbonate alkalizing agent, preferably sodium bicarbonate, or from about 75% to about 85% sodim hexametaphosphate, from about 7% to about 13% carbonate alkalizing agent preferably sodium bicarbonate and from about 7% to about 13% sodium acid pyrophosphate in addition to the other ingredients of the pickle.

THE DETAILED DESCRIPTION OF THE PRESENT INVENTION

Figure 1:
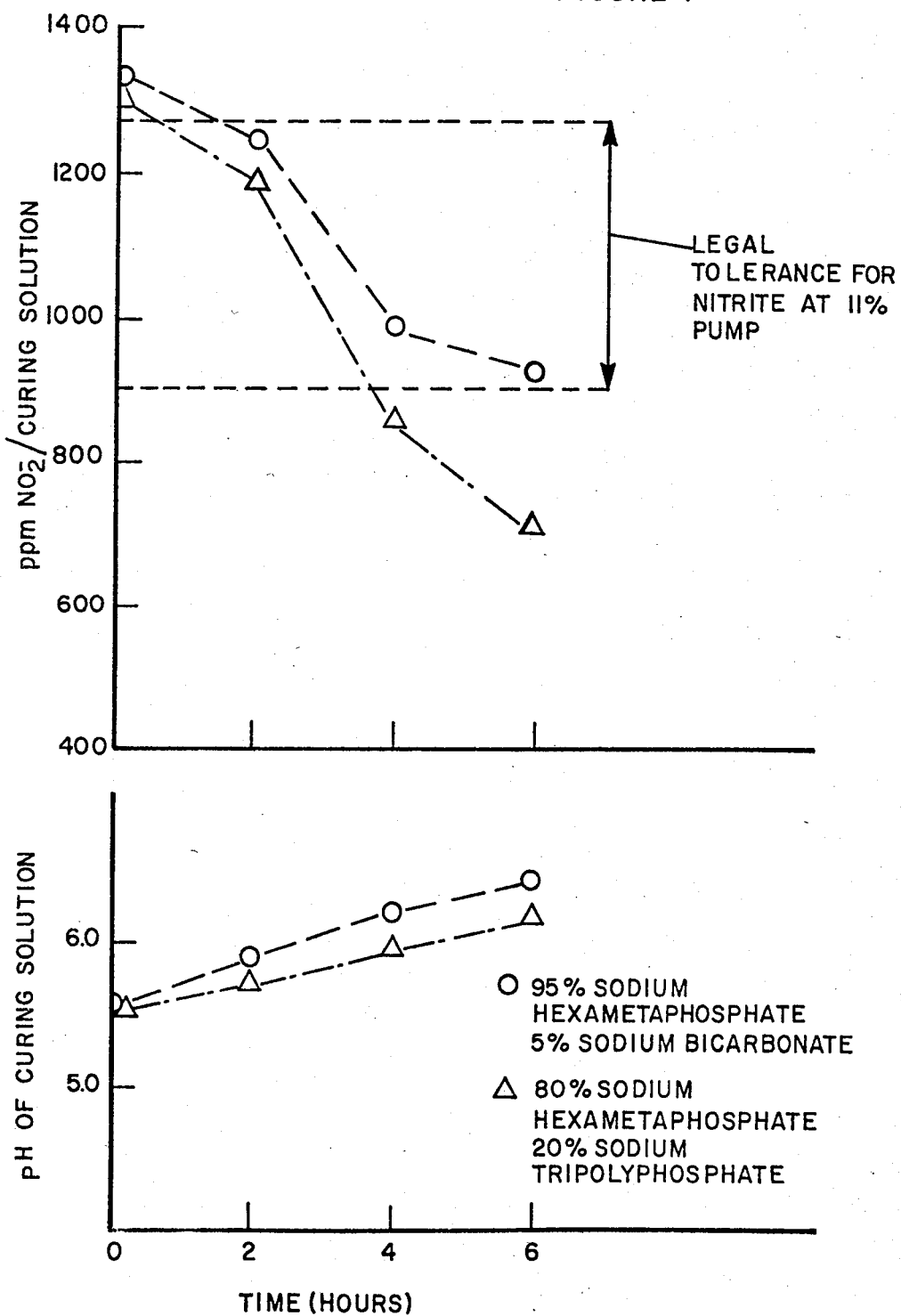
FIG. 1 is a graphical representation of the data of Example 25.

Sodium hexametaphosphate is considered a misnomer inasmuch as it is neither a metaphosphate nor does it have six units. Sodium hexametaphosphate is a medium chain length polymeric phosphate of the type:

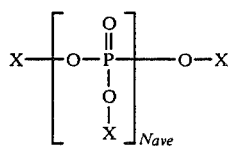

and X represents individually hydrogen or an alkali metal including ammonium and preferably sodium or potassium. $N_{ave}$ represents an average chain length between about not less than 5 and generally not more than about 25. The average chain length as employed herein is intended to represent a statistical average chain length or indication of the number of recurring units linked together comprising the anionic species. Such an average is determined by titration as described in Van Wazer et al., Analytical Anal. Chem. 26, 1755–9(1954).

The alkali metal acid pyrophosphate can either be sodium or potassium though the sodium acid pyrophosphate is preferred.

The carbonate alkalizing agent can be illustrated by sodium and potassium carbonate and bicarbonate and preferably sodium bicarbonate. The use of sodium bicarbonate is particularly preferred in combination with sodium hexametaphosphate to assist in its dissolution. The sodium bicarbonate when added as part of a dry mix with sodium hexametaphosphate to an aqueous solution effervesces causing a churning action which assists in dissolving the sodium hexametaphosphate. Good manufacturing methods are required to dissolve the sodium hexametaphosphate and prevent the taffy formation of wetted sodium hexametaphosphate from occurring in the tank. Taffy formation can usually be avoided by vigorous agitation.

The nitric oxide-forming compounds which are effective for the purposes of the present invention can be organic or inorganic nitrites as is well known to one skilled in the art.

Preferably, the nitric oxide forming compound is sodium nitrite, though blends of sodium nitrite and sodium nitrate can also be used. Organic nitrites such as the $C_2$–$C_8$ alkyl nitrites and specifically, butyl nitrite, can also be used.

The pickle also contains a nitrosamine inhibitor, a color enhancing agent such as ascorbic acid, erythorbic acid and their salts and mixtures thereof. These will be referred to collectively hereinafter as erythorbate.

In addition to the nitric oxide-forming compounds, the phosphate, salt, the erythorbate and the carbonate alkalizing agent, the pickle can contain other ingredients normally used for that purpose such as sugar, dextrose and spices.

A pickle generally contains from about 10% to about 20% salt, from about 0.05% to about 0.15% nitrite (in an amount sufficient at the percent pumped to provide a residual of 120 ppm ±20 ppm sodium nitrite in the bacon) and a sufficient amount of erythorbate to provide at the percent pumped a residual in the bacon of 600 ppm ±20% erythorbate based on the sodium salt thereof. Adjustments in amounts for the acid and for the isomer ascorbic acid and its salts is required due to a difference in molecular weight. The pickle also generally contains from about 2.0% to about 4.5% of the composition of the present invention. These percentages are based on the aqueous pickle as prepared for use.

While the composition of the present invention can be provided to the meat packer as a dry powder which after mixing with water forms a pickle containing all of the ingredients normally found in a pickle, it is generally preferred to provide the meat packer with a combination of carbonate alkalizing agent and phosphates. This allows the meat producer to use his own pickle formulation and blend of spices. A sufficient amount of sodium hexametaphosphate with or without sodium acid pyrophosphate and carbonate alkalizing agent are required to be added to a pickle to maintain the natural pH of the meat and provide the desired water binding characteristics. This is preferably accomplished by a blend of from about 93% to about 97% sodium hexametaphosphate and from about 3% to about 7% sodium bicarbonate. A second composition useful in the present invention contains from about 7% to about 13% sodium acid pyrophosphate, from about 7% to about 13% sodium bicarbonate and from about 75% to about 85% sodium hexametaphosphate, the foregoing percentages totaling 100% based on the weight of the components recited for the blend of the second composition.

Alkali metal carbonates, in deference to alkali metal bicarbonates, are more alkaline and therefore require less for effective pH control. However, the carbonates are less preferred since the reaction is less tolerant and is more difficult to control than with the bicarbonate. Carbonate can be used within a range of from about 2% to about 4%. The foregoing blends can be made with the corresponding potassium salts and blends of the sodium and potassium salts.

The compositions of the invention can be prepared as dry powders and furnished to the meat processor to be added to his pickle, before, during or after the addition of the other ingredients of the pickle.

The composition of the present invention upon dissolution in water to form the pickle solution can be applied to the meat by soaking or injection. A combination of these procedures can also be used. The meat can be soaked in the pickle for a sufficient time to permit the diffusion of the solution throughout the meat. Alternatively, the pickle solution can be pumped through the vascular system of the meat or injected directly into the muscle by the use of plurality of needles. After pumping or injection, the meat may be given a soaking period in the pickle. In the case of bacon, the amount of pickle solution incorporated into the meat generally ranges from about 8% to about 20%. These amounts are subjected to wide variation depending on the choice of the meat processor. The process of the present invention can be used in any cured meat system but is particularly adapted to the curing of whole skeletal meat in contrast to comminuted meat which can also be cured in accordance with the present invention. The pickle can be directly admixed with a comminuted meat system. The invention is particularly adapted to the curing of bacon because of the amounts of nitrite used and the fact that it is ultimately fried.

Meat in accordance with the present invention may be processed using standard techniques presently in use relating to storage, cooling, rate of injection, handling, tumbling and the like. In the preferred form of the invention, utilizing the blend of sodium hexametaphosphate, sodium acid pyrophosphate and sodium bicarbonate, the only change required is that these dry blends are added to the aqueous pickle at any convenient time prior to pumping in order to provide the necessary amount of phosphate in the pickle. The amount of these compositions actually used is such as to add about 0.25% to 0.45% residual phosphate salt to the meat.

In general, a curing operation is effected at a temperature of from about 1.6°–25° C. The temperature of curing is preferably selected on the basis of the type of mixture and meat which is being used. To minimize microbial growth, it is preferred to employ a curing temperature within the range of about 1.67°–15.6° C. Following the injection or blending of the pickle solution into the meat, it may be immediately subjected to smoking or cooking treatment. However, for commercial practice, it is preferred that following the curing treatment the meat is allowed to stand for at least one day and up to one week in order to insure adequate distribution of the curing solution through the meat. After the meat is cured, it is smoked in the usual manner by subjecting the same to a temperature of from about 48° C. to about 82° C. for a period of about 5–30 hours. Instead of smoking, the meat may be placed in a can, mold or fibrous container and cooked to an internal temperature sufficient to coagulate the meat protein. In the case of bacon, the bacon can be smoked as a side or slab or the meat can be sliced prior to smoking.

The amount of residual nitrite as used herein is determined by A.O.A.C. methods 24.037 and 24.038 modified by adjusting the pH of the nitrite-containing solution extracted from the meat to neutral to minimize loss of nitrite during extraction. A period of three weeks has been set by the government as an average length of time it takes for bacon to go from the curing floor to the frying pan. Results are reported on that basis.

The present invention will be illustrated in the examples which follow:

EXAMPLES 1–9

The curing effect of the compositions of the present invention were shown in a model system. 45.5 kilograms of fresh pork bellies (15) ranging in size from 2.27 to 3.55 kilograms were ground through a grinder having a plate with 0.95 centimeter openings. Samples each containing 4085 grams of ground pork bellies were mixed with a pickle in a Hobart TM mixer for 4½ minutes at speed No. 1. A bulk pickle of the following composition was prepared:

TABLE I

| | | |
|---|---|---|
| Salt | 920 grams | 15.5% |
| Sugar | 325 grams | 5.5% |
| Sodium Erythorbate | 35 grams | .6% |
| Dextrose | 50 grams | .8% |
| Water (10° C.) | 4600 grams | 77.6% |
| | 5930 grams | 100% |

430 milliliters of nitrite free pickle were removed for Examples 1 and 2. Then 6.96 grams (0.126%) sodium nitrite dissolved in about 20 milliliters water were added to the remaining pickle.

The 430 milliliters of nitrite free pickle were divided into two 215 milliliter samples. A 4086 grams sample of meat was divided into two 2043 grams samples. In Example 1, the 215 milliliters of pickle were blended with 2043 grams of meat to provide a control with no nitrite and no phosphate. The remaining pickle and meat were mixed together with 8.8 grams of dry sodium tripolyphosphate to provide Example 2 having no nitrite with phosphate. A third sample with nitrite and no phosphate (Example 3) was prepared by mixing 215 milliliters of the nitrite containing pickle with 2043 grams of meat. The remaining examples were prepared by blending 430 milliliters of nitrite containing pickle, 4086 grams of chopped pork bellies and 17.6 grams of a dry phosphate additive as set forth in the table below:

TABLE II

| | |
|---|---|
| Example 4 | Sodium Tripolyphosphate |
| Example 5 | Blend of 90% Sodium Tripolyphosphate 10% Sodium Hexametaphosphate |
| Example 6 | 80% Sodium Tripolyphosphate |

TABLE II-continued

| | |
|---|---|
| Example 7 | 20% Sodium Hexametaphosphate Sodium Hexametaphosphate |
| Example 8 | 95% Sodium Hexametaphosphate 5% Sodium Bicarbonate |
| Example 9 | 80% Sodium Hexametaphosphate 10% Sodium Acid Pyrophosphate 10% Sodium Bicarbonate |

Each sample was then tightly packed in a stainless steel pan to a thickness of about 3.8 centimeters using another pan as a compressor. The samples were subjected to 2 vacuum cycles to remove air voids, compressed again and chilled overnight at 1.67° C. The samples were heat processed in a smokehouse using the following temperature schedule:

TABLE III

| | Temperature | |
|---|---|---|
| Time | Dry Bulb | Wet Bulb |
| Preheat | 43.3° C. | 35° C. |
| 5 hrs. 20 min. | 43.3° C. | 35° C. |
| 1 hour | 65.6° C. | — |

After cooking, the samples were held in a cooled room at 1.67° C. Samples were sliced on a commercial slicer at setting 10. A portion of each sample was tested for nitrite concentration. The average residue nitrite level of a no nitrite/no phosphate sample (Example 1) and no nitrite/sodium tripolyphosphate sample (Example 2) were subtracted from the gross nitrite readings of Examples 3–9 to obtain the residual nitrite for each sample. The pH's of the cured meat samples were also taken. The following results were obtained:

TABLE IV

| | | DAYS | | | | |
|---|---|---|---|---|---|---|
| | | 0 | 7 | 14 | 21 | 28 |
| Example 1 | pH | 5.8 | 5.9 | 5.8 | 5.7 | 5.5 |
| ppm-nitrite | | 6.0 | 2.1 | 1.7 | 1.7 | 2.1 |
| Example 2 | pH | 6.4 | 6.3 | 6.2 | 6.1 | 6.0 |
| ppm-nitrite | | 7.7 | 3.4 | — | 0.4 | 3.4 |
| Average ppm nitrite for blind sample | | 6.8 | 2.8 | 1.7 | 1.1 | 2.8 |
| Example 3 | pH | 6.1 | 6.1 | 6.0 | 6.1 | 5.8 |
| ppm-nitrite | | 34.8 | 31.6 | 15.3 | 22.7 | 9.1 |
| Example 4 | pH | 6.4 | 6.4 | 6.3 | 6.3 | 6.3 |
| ppm-nitrite | | 57.3 | 45.2 | 31.5 | 32.1 | 16.3 |
| Example 5 | pH | 6.4 | 6.4 | 6.3 | 6.3 | 6.3 |
| ppm-nitrite | | 57.7 | 48.6 | 36.6 | 33.3 | 23.1 |
| Example 6 | pH | 6.4 | 6.3 | 6.3 | 6.3 | 6.2 |
| ppm-nitrite | | 58.6 | 42.7 | 30.2 | 28.1 | 16.3 |
| Example 7 | pH | 6.0 | 6.1 | 6.0 | 6.0 | 6.0 |
| ppm-nitrite | | 27.1 | 18.0 | 7.7 | 10.8 | 9.5 |
| Example 8 | pH | 6.2 | 6.1 | 6.1 | 6.2 | 6.0 |
| ppm-nitrite | | 33.9 | 23.1 | 11.5 | 10.8 | 6.6 |
| Example 9 | pH | 6.2 | 6.1 | 6.1 | 6.2 | 6.1 |
| ppm-nitrite | | 34.8 | 28.7 | 18.7 | 12.5 | 10.0 |

As it can be seen from a review of this data, the use of the invention compositions (Examples 8 and 9) provide nitrite residuals and pH values similar to the no-phosphate sample (Example 3) and significantly less than those provided by the alkaline phosphates (Examples 4, 5 and 6). Sodium hexametaphosphate (Example 7) provides the most rapid nitrite but its pickle solutions are not stable as shown later in Examples 16–24. Since the U.S. government has indicated that bacon is generally cooked after three weeks from its date of packing, the nitrite levels of bacon prepared in accordance with the present invention would be low enough to prevent substantial formation of nitrosamine but still retain color, flavor and bacterial inhibition characteristics of the nitrite.

EXAMPLE 10

A pickle solution was prepared by dissolving 18.56 kg salt (NaCl), 6.98 kg sugar, 2.84 kg of a commercial phosphate blend of about 75% sodium tripolyphosphate and about 25% sodium hexametaphosphate or 2.84 kg of a blend of about 95% sodium hexametaphosphate and about 5% sodium bicarbonate in 112.88 kg water. After holding the pickle overnight at 1.67° C., 113.2 gm sodium nitrite and 509.4 gms sodium erythorbate dissolved in a small quantity of water (about 20 ml) were admixed with the pickle. A pickle without the phosphate was also prepared.

Paired bellies were injected at 10° C. The bacon was processed and smoked the same day. The smokehouse processing schedule is given in Table V. After processing, the bacon was hung for six days at 1.67° C. then the bacon was sliced and samples were taken for four consecutive weeks. The results are set forth in Tables VI and VII.

TABLE V

| | Dry Bulb | Wet Bulb |
|---|---|---|
| 0–15 Minutes | 0 to 60° C. | 0 to 48.9° C. |
| 15–90 Minutes | 60° C. to 65.5° C. | 48.9° C. to 51.6° C. |
| 90–150 Minutes | 65.5° C. to 71.1° C. | 51.6° C. to 54.4° C. |
| 150–180 Minutes | 71.1° C. to 51.6° C. | 54.4° C. to 32.2° C. |
| 180–240 Minutes | 51.6° C. to 43.3° C. | 32.2° C. to 35° C. |
| 240–420 Minutes | 43.3° C. to 37.8° C. | 35° C. to 35° C. |

TABLE VI

| Example | Type | Green Wgt. g | Immediate Pumped Wgt. g | Immediate % Pump | After 30 Mnts. % Pump | Smoked Wgt. g | Cooked Yield as % of Green Wgt. |
|---|---|---|---|---|---|---|---|
| 10 L | A | 4715 | 5631 | 19 | 16 | 4980 | 106 |
| R | B | 4675 | 5644 | 21 | 16 | 4973 | 106 |
| 11 R | A | 5220 | 5964 | 14 | 14 | 5430 | 104 |
| L | B | 4757 | 5484 | 15 | 13 | 4984 | 105 |
| 12 R | A | 4540 | 5260 | 16 | 15 | 4641 | 102 |
| L | C | 4940 | 5793 | 17 | 14 | 5114 | 104 |
| 13 L | A | 5410 | 6212 | 15 | 13 | 5625 | 104 |
| R | C | 5248 | 6100 | 16 | 14 | 5500 | 105 |
| 14 L | B | 4955 | 5702 | 15 | 12 | 5188 | 105 |
| R | C | 5605 | 6641 | 18 | 16 | 6007 | 107 |
| 15 R | B | 4868 | 5760 | 18 | 14 | 5089 | 105 |

TABLE VI-continued

| Example | Type | Green Wgt. g | Immediate Pumped Wgt. g | Immediate % Pump | After 30 Mnts. % Pump | Smoked Wgt. g | Cooked Yield as % of Green Wgt. |
|---|---|---|---|---|---|---|---|
| L | C | 4680 | 5489 | 17 | 15 | 4970 | 106 |

A = 95% Hexametaphosphate/5% Sodium Bicarbonate.
B = 75% Sodium Tripolyphosphate/25% Sodium Hexametaphosphate.
C = No Phosphate.

TABLE VII

| | Week 0 | | Week 1 | | Week 2 | |
|---|---|---|---|---|---|---|
| Example | pH | Gross ppm Nitrite | pH | Gross ppm Nitrite | pH | Gross ppm Nitrite |
| 10 L | 5.8 | 21.7 | 5.8 | 8.1 | 5.8 | 7.7 |
| R | 6.0 | 34.0 | 6.0 | 20.4 | 6.0 | 10.2 |
| 11 R | 6.0 | 22.1 | 6.0 | 13.2 | 6.0 | 6.4 |
| L | 6.0 | 22.1 | 6.1 | 14.0 | 6.1 | 9.8 |
| 12 R | 5.8 | 17.4 | 5.8 | 11.5 | 5.8 | 6.4 |
| L | 5.7 | 17.4 | 5.7 | 8.5 | 5.6 | 8.5 |
| 13 L | 5.9 | 20.0 | 6.0 | 9.4 | 6.0 | 6.4 |
| R | 5.7 | 24.7 | 5.7 | 12.8 | 5.7 | 7.7 |
| 14 L | 5.9 | 19.1 | 5.9 | 8.9 | 5.9 | 4.3 |
| R | 5.4 | 13.2 | 5.5 | 7.2 | 5.5 | 6.0 |
| 15 R | 6.1 | 33.2 | 6.1 | 22.1 | 6.0 | 13.4 |
| L | 5.7 | 29.3 | 5.8 | 13.6 | 5.8 | 5.3 |

As can be seen from Table VII, generally the bacon prepared in accordance with the present invention had significant reductions in residual nitrite compared to alkaline phosphate bacon and nitrite and pH values were about equivalent to no-phosphate bacon.

PICKLE STABILITY

The stability of pickle solutions described in the invention are illustrated below.

Pickle solutions were formulated to provide the same level of ingredients in bacon as described in Examples 1–9, when injected at a 10% pump level: 74.5% water, 14.7% salt, 6.0% sugar, 0.54% sodium erythorbate, 0.12% sodium nitrite and 4.0% phosphate-containing composition (or water control).

The following phosphate-containing compositions were used:

| Example 16 | Sodium Hexametaphosphate |
|---|---|
| Example 17 | 65% Sodium Tripolyphosphate |
| | 35% Sodium Hexametaphosphate |
| Example 18 | 84% Sodium Hexametaphosphate |
| | 6% Sodium Bicarbonate |
| | 10% Sodium Acid Pyrophosphate |
| Example 19 | Water Control |
| Example 20 | 79% Sodium Hexametaphosphate |
| | 6% Sodium Bicarbonate |
| | 15% Sodium Acid Pyrophosphate |
| Example 21 | 97% Sodium Hexametaphosphate |
| | 3% Sodium Bicarbonate |

The pickle solutions were agitated at a constant rate at 10° C. for 8 hours, then held static an additional 16 hours at 10° C. Results appear in Table VIII.

TABLE VIII

| | PPM Nitrite | | | | | | pH | |
|---|---|---|---|---|---|---|---|---|
| Ex. | 0 hrs. | 2 hrs. | 4 hrs. | 6 hrs. | 8 hrs. | 24 hrs. | Initial | 28 hr. |
| 16 | 1003 | 535 | 378 | 285 | 238 | 26 | 5.0 | 5.8 |
| 17 | 1062 | 1126 | 1020 | 1071 | 1160 | 1169 | 6.6 | 6.6 |
| 18 | 1020 | 961 | 820 | 710 | 710 | 302 | 5.4 | 6.4 |
| 19 | 1020 | 1084 | 1024 | 995 | 1110 | 1084 | 7.0 | 6.6 |
| 20 | 1041 | 850 | 659 | 527 | 476 | 81 | 5.3 | 6.1 |
| 21 | 1020 | 973 | 892 | 884 | 939 | 76 | 5.6 | 6.7 |

The results show good nitrite stability (less than 20% nitrite loss after 8 hours), i.e. stable pickle solutions for the alkaline phosphate (Example 17), no-phosphate (Example 19) and the invention (Example 21). Pickle solutions with a high ratio of acidic phosphate to bicarbonate (Examples 18 and 20) have less stability and hexmetaphosphate alone (Example 16) is the least stable.

In addition, examples of pickle formulations used by a commercial bacon processor were prepared to contain: 80.2% water, 10.7% salt, 6.7% sugar, 0.28% sodium erythorbate, 0.06% sodium nitrite, 1.7% phosphate-containing composition, 0.05% dextrose and 0.05% sodium citrate.

The phosphate-containing compositions were:

| Example 22 | Sodium Hexametaphosphate |
|---|---|
| Example 23 | 90% Sodium Tripolyphosphate |
| | 10% Sodium Hexametaphosphate |
| Example 24 | 95% Sodium Hexametaphosphate |
| | 5% Sodium Bicarbonate |

The pickle solutions were agitated at constant RPM for four hours at 10° C., then held static for an additional 14 hours. Results are presented in Table IX.

TABLE IX

| | PPM Nitrite | | | | Final |
|---|---|---|---|---|---|
| Ex. | 0 hrs. | 2 hrs. | 4 hrs | 20 hrs. | pH |
| 22 | 506 | 484 | 387 | 149 | 6.5 |
| 23 | 493 | 536 | 561 | 510 | 6.7 |
| 24 | 510 | 544 | 561 | 468 | 7.2 |

These results again show that alkaline phosphate (Example 23) and the invention (Example 24) provide stable pickle solutions whereas the hexametaphosphate pickle solution is not stable.

EXAMPLE 25

The nitrite stability of a pickle solution prepared in accordance with the present invention was compared to a phosphate pickle having the same initial pH not prepared in accordance with the invention.

The pickle solution contained 74.6% water, 14.7% sodium chloride, 0.55% sodium erythorbate, 6.0% sugar, 0.12% sodium nitrite and 4.0% phosphate mixture. The phosphate mixtures used were:

(a) 95% Sodium Hexametaphosphate/5% Sodium Bicarbonate (b) 80% Sodium Hexametaphosphate/20% Sodium Tripolyphosphate The water was chilled to 10° C. All dry ingredients except the phosphate were dissolved and 288 grams of solution was added to each of two beakers. Twelve grams of the appropriate phosphate mixture was then dissolved in each beaker and agitated at 100 RPM with a Phipps and Bird Multistirrer at 10° C.

The solutions were analyzed for pH using a pH meter standardized at 10° C. and nitrite at 0, 2, 4 and 6 hours. The following results were obtained.

TABLE X

| Example | 0 hrs. | 2 hrs. | 4 hrs. | 6 hrs. |
|---|---|---|---|---|
| | Nitrite (ppm) | | | |
| (a) | 1337 | 1247 | 989 | 937 |
| (b) | 1312 | 1187 | 860 | 710 |
| | pH | | | |
| (a) | 5.52 | 5.88 | 6.19 | 6.41 |
| (b) | 5.52 | 5.70 | 5.95 | 6.16 |

Current U.S.D.A. regulations require that bacon be injected with 120 ppm sodium nitrite. The industry accepted tolerance (generally accepted by the U.S.D.A.) is ±20 ppm. A pickle must contain sufficient nitrite to achieve the requisite residual level of nitrite in the bacon at the percentage pumped. For bacon pumped 11%, the nitrite level in the pickle must range from 909 ppm to 1273 ppm sodium nitrite.

U.S.D.A. also requires that the pickle contain a sufficient amount of sodium erythorbate to provide 600 parts per million ±20% calculated as sodium erythorbate at the percentage pumped. The test solution provides approximately such amount.

While the pickle was designed to contain 1200 parts per million sodium nitrite, weighing error and analytical error shows a deviation from that amount. For comparison purposes, legal tolerance at 11% is shown on the graph in FIG. 1 to emphasize the fact that while the solution prepared in accordance with the present invention and that of the control were nearly identical in initial nitrite composition, they deviated substantially over the period of six hours. The data quite aptly shows that the curing solutions prepared using the compositions of the present invention can remain within the legal tolerance limits for nitrite for a period of time longer than that achieved using the control composition.

The data and the lower graph of FIG. 1 also shows that the pH of a curing solution prepared in accordance with the invention rises faster over the six hour period than the control which had the same initial starting pH. Comparing the two sets of data (graphs), it can be seen that the pH of the curing solution prepared in accordance with the invention elevates at a sufficient rate to maintain nitrite stability longer, contrary to the control.

What is claimed is:

1. A method for preparing cured bacon from pork bellies comprising contacting said pork bellies with a stable curing solution comprising an alkali metal chloride, a soluble nitric oxide forming compound, a color enhancing agent selected from the group consisting of ascorbic acid, erythorbic acid and salts thereof and mixtures thereof and a member selected from the group consisting of (A) from about 93% to about 97% of an alkali metal hexametaphosphate and from about 7% to about 3% of a carbonate alkalizing agent and (B) from about 75% to about 85% of an alkali metal hexametaphosphate, and from about 7% to about 13% alkali metal acid pyrophosphate and from about 7% to about 13% carbonate alkalizing agent, the percentages in (A) or (B) totaling substantially 100% based on the weight of the components in subsections (A) or (B), the pH of the bellies after contact being about equivalent to the natural pH of the bellies.

2. The method as recited in claim 1 wherein said carbonate alkalizing agent is selected from the group consisting of alkali metal carbonate and alkali metal bicarbonate.

3. The method as recited in claim 1 wherein said carbonate alkalizing agent is sodium bicarbonate.

4. The method as recited in claim 1 wherein said curing solution further includes sugar.

5. The method as recited in claim 1 wherein said color enhancing agent is sodium erythorbate.

6. The method as recited in claim 1 wherein said alkali metal is sodium.

7. The product of the method of claim 1.

8. In a method for preparing an aqueous stable curing solution for bacon comprising an alkali metal chloride, a soluble nitric oxide-forming compound, a color enhancing agent selected from the group consisting of ascorbic acid, erythorbic acid and salts thereof and mixtures thereof and an alkaline phosphate, the improvement which comprises substituting for the alkaline phosphate in said aqueous solution, before, during or after addition of the other ingredients, a member selected from the group consisting of (A) from about 93% to about 97% sodium hexametaphosphate and from about 7% to about 3% of a carbonate alkalizing agent and (B) from about 75% to about 85% sodium hexametaphosphate, from about 7% to about 13% sodium acid pyrophosphate and from about 7% to about 13% carbonate alkalizing agent, the percentages in (A) or (B) totaling substantially 100% based on the weight of the components recited in subsections (A) or (B).

9. The method as recited in claim 3 wherein said carbonate alkalizing agent is sodium bicarbonate.

10. A method for preparing a cured bacon having low residual nitrite levels comprising contacting pork bellies with an aqueous curing solution comprising from about 10% to about 20% sodium chloride, an amount, at the level incorporated in the pork bellies, of a soluble nitric oxide-forming compound and a color enhancing agent selected from the group consisting of ascorbic acid, erythorbic acid and salts thereof and mixtures thereof sufficient to provide residuals in the bacon of 120 ppm ±20 ppm nitrite as sodium nitrite and 600 ppm ±20% erythorbate as sodium erythorbate, respectively, and an amount of a phosphate composition sufficient to provide from about 0.25% to about 0.45% residual phosphate salt in the bacon, the pH of the pork bellies after contact being about equivalent to the natural pH of the pork bellies, said phosphate composition being selected from the group consisting of (A) from about 93% to about 97% sodium hexametaphosphate, and from about 3% to about 7% sodium bicarbonate and, (B) from about 75% to about 85% sodium hexametaphosphate, from about 7% to about 13% sodium acid pyrophosphate, and from about 7% to about 13% sodium bicarbonate, the percentages relative to the curing solution being by weight based on the total weight of the aqueous solution, the percentages under subsections (A) or (B) totaling substantially 100% based on the weight of the components recited in subsections (A) or (B).

11. Bacon, having a low residual nitrite level, comprising, as a curing agent therefor, an aqueous stable curing solution comprising from about 10% to about 20% sodium chloride, from about 0.05% to about 0.15% soluble nitric oxide-forming compound, an amount of erythorbate sufficient to provide a residual in the bacon of 600 ppm ±20% erythorbate calculated as sodium erythorbate, and from about 2.0% to about 4.5% of a composition selected from the group consisting of (A) from about 93% to about 97% sodium hexametaphosphate, and from about 3% to about 7% sodium bicarbonate, and (B) from about 75% to about 85% sodium hexametaphosphate, from about 7% to about 13% sodium acid pyrophosphate, and from about 7% to about 13% sodium bicarbonate, the percentages relative to the curing solution being by weight based on the total weight of the aqueous solution, the percentages in subsections (A) or (B) totaling substantially 100% based on the weight of the components recited in subsections (A) or (B).

12. An aqueous stable meat curing solution comprising sodium chloride, a soluble nitric oxide-forming compound, an erythorbate, an alkali metal hexametaphosphate and a carbonate alkalizing agent.

13. An aqueous stable curing solution for curing pork bellies comprising from about 10% to about 20% sodium chloride, from about 0.05% to about 0.15% soluble nitric oxide-forming compound, an amount of erythorbate sufficient to provide a residual in the pork bellies of 600 ppm ±20% erythorbate calculated as sodium erythorbate and from about 2.0% to about 4.5% of a composition selected from the group consisting of (A) from about 93% to about 97% sodium hexametaphosphate, and from about 3% to about 7% sodium bicarbonate, and (B) from about 75% to about 85% sodium hexametaphosphate, from about 7% to about 13% sodium acid pyrophosphate, and from about 7% to about 13% sodium bicarbonate, the percentages relative to the curing solution being by weight based on the total weight of the aqueous solution, the percentages in subsections (A) or (B) totaling substantially 100% based on the weight of the components recited in subsections (A) or (B).

* * * * *